[11] 3,564,210

[72] Inventor Anthony J. Presti
 Warren, N.J.
[21] Appl. No. 779,716
[22] Filed Nov. 29, 1968
[45] Patented Feb. 16, 1971
[73] Assignee Farrington Manufacturing Company
 New York, N.Y.

[54] APPARATUS COMBINING A VARIABLE AMOUNT IMPRINTER WITH CREDIT VERIFICATION CIRCUITRY
24 Claims, 11 Drawing Figs.

[52] U.S. Cl. ............................................ 235/61.7;
 340/149
[51] Int. Cl. ....................................... G06k 5/00,
 H04g 3/00
[50] Field of Search .................................. 235/61.7,
 61.7b; 340/149A

[56] References Cited
UNITED STATES PATENTS
| | | | |
|---|---|---|---|
| 2,785,388 | 3/1957 | McWhirter | 340/149 |
| 3,184,714 | 5/1965 | Brown, Jr. et al. | 235/61.7X |
| 3,344,258 | 9/1967 | Michels | 235/61.7 |
| 3,394,246 | 7/1968 | Goldman | 340/149 |
| 3,401,830 | 9/1968 | Mathews | 235/61.7 |

Primary Examiner—Daryl W. Cook
Attorney—Gerald J. Ferguson, Jr.

ABSTRACT: Disclosed is a credit verification imprinter for use with a credit card embossed or etched with data typically corresponding to the customer's name, address, and numerical identification. Also provided on the card is magnetically BCD encoded data relating to (1) the charge limit the card may be used for in a predetermined period of time, preferably a month; (2) the time interval in which the card was last used; and (3) the accumulated money total of charge purchases made with the card during the time interval indicated in (2). The sales clerk registers into a variable money amount imprinter the money amount of the current transaction together with the current date, this information to be imprinted together with the information of the charge onto a sales slip or the like if the current credit transaction is approved.

Before the imprinting operation can take place, the magnetically encoded data is read by a movable read/write head disposed beneath the print bed. A credit verification test is then conducted by appropriate circuitry to determine whether the card has been used for credit transactions exceeding the limit listed in (1) above during the interval of time indicated by the month setting on the variable date wheels of the imprinter. Other checks are also made to establish the authenticity of the information magnetically encoded on the card to insure that no tampering or data transmission errors have occurred. Different colored lights are provided on the imprinter chassis to indicate the occurrence of different conditions detected by the data verification circuitry. Upon completion of the data verification check, a stop is removed from the path of travel of the imprinting head thereby permitting the imprinting operation to take place. After the imprinting head has been returned to its start position a switch is caused to close and thereby reset all credit verification registers preparatory to the next credit operation.

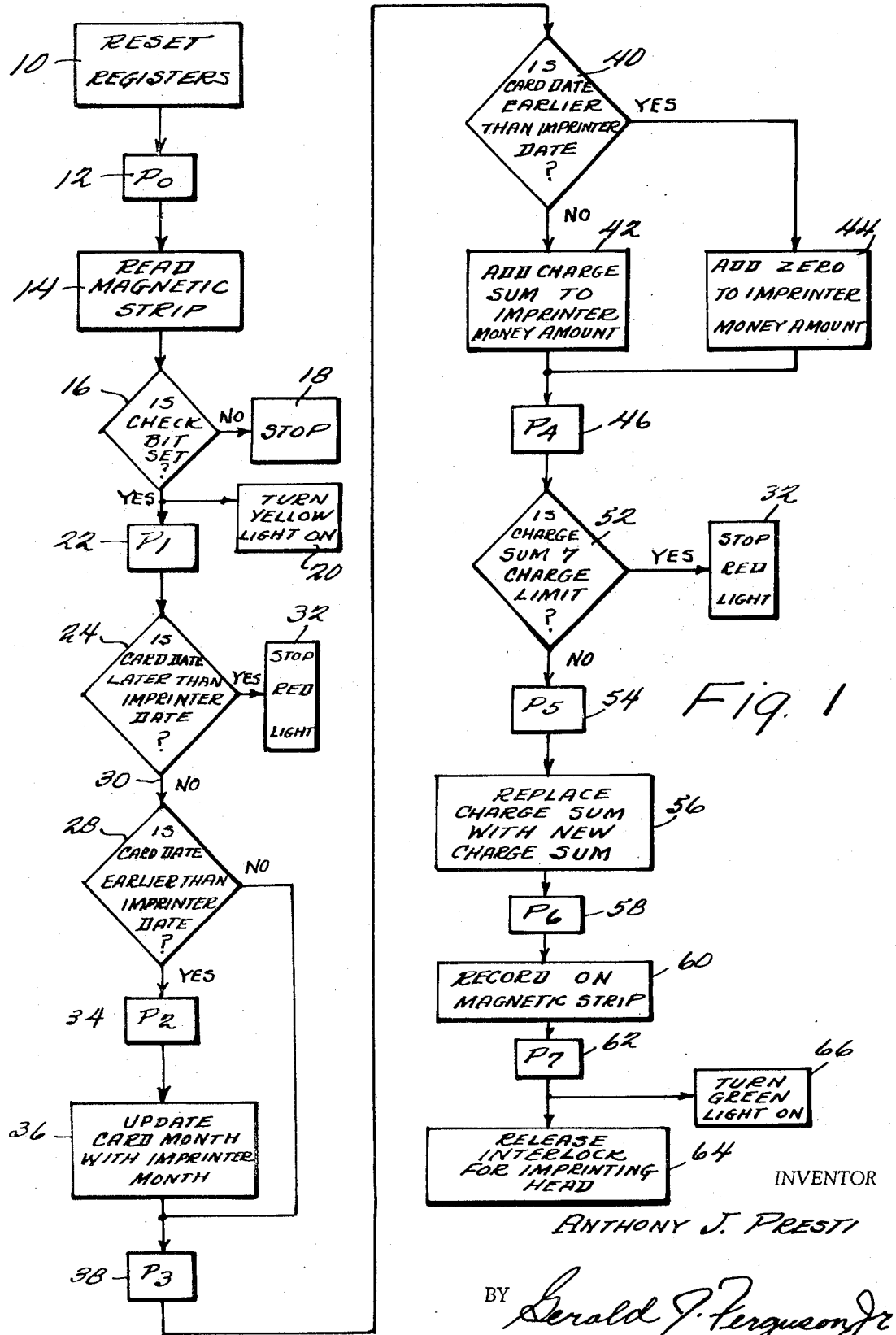

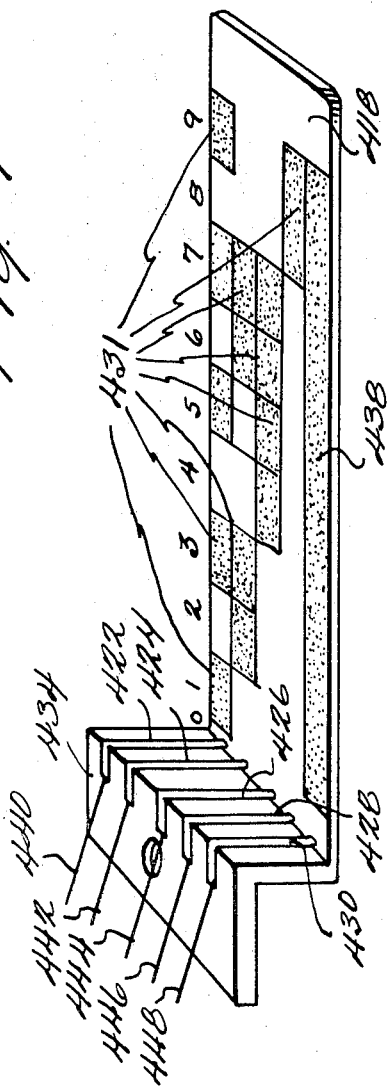
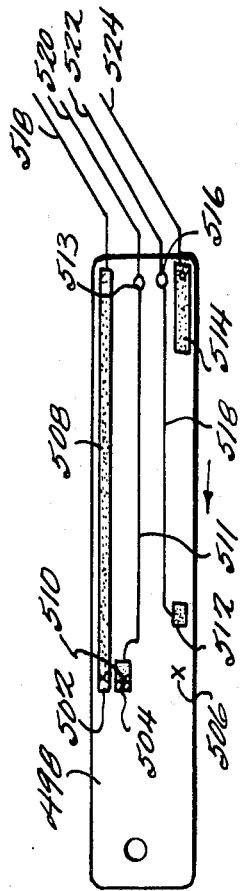
INVENTOR
ANTHONY J. PRESTI
BY Gerald J. Ferguson Jr.
ATTORNEY

INVENTOR
ANTHONY J. PRESTI

BY Gerald J. Ferguson Jr.
ATTORNEY 3,564,210

APPARATUS COMBINING A VARIABLE AMOUNT IMPRINTER WITH CREDIT VERIFICATION CIRCUITRY

BACKGROUND OF THE INVENTION

This machine relates to imprinting devices and, in particular, to imprinters having incorporated therewith credit verification circuitry.

As has been recently publicized, there are many trends indicating the change from an economy based on cash to one based largely on credit and, in particular, credit cards and the like. With such anticipated widespread use of credit cards, it is clear that more realistic controls will have to be imposed on their use if their use is to extend to a broad segment of the population. In particular, there are those who because of their financial situation should not be entitled to as much credit as others more fortunately situated. With such restrictions realistically imposed, a system of credit based on charge cards could extend down to relatively low income levels and thus permit the broadest possible population base to use the system.

At first blush, it would seem that a computer centered credit verification system would be ideal wherein the customer upon presentation of his credit card would have his credit for his intended purchase immediately checked in the computer to establish whether his credit were sufficient to justify the credit transaction he desires to make. Given the number of credit transactions which occur daily within the various commercial centers throughout the United States and other countries, it is clear that such a computer system would indeed be prohibitive in terms of expense.

SUMMARY OF THE INVENTION

It is thus a primary object of this invention to provide a credit card imprinter incorporating a fairly simple credit verification method and circuits to thereby enable a more practical widespread use of credit cards.

It is a further object of this invention to provide circuitry and a method for credit verification whereby the use of credit cards and the like may be extended to a broader base of the population.

It is a further object of this invention to provide an improved credit card containing thereon information necessary to verify the credit standing of the card bearer.

It is a further object of this invention to provide credit verification circuitry for use with such a card whereby the card may be analyzed and updated to thereby facilitate usage of the card in credit transactions while at the same time maintaining a control over excessive usage of the card.

It is a further object of this invention to provide a card of the above type which is substantially tamper-proof.

It is a further object of this invention to provide a method and circuitry for performing checks on the data stored on the above type card to detect whether the stored data has been tampered with or transmitted in error.

It is a further object of this invention to provide credit verification circuitry for use with an imprinter whereby the money amount of a current transaction is entered into the imprinter by a sales clerk or the like and that money amount is accumulated with the total money amount of prior transactions over a predetermined interval of time to determine if the accumulated total exceeds the charge limit also stored on the above type card.

Other objects and advantages of this invention will become apparent upon reading the appended claims in conjunction with the following detailed description and the attached drawing.

BRIEF DESCRIPTION OF THE DRAWING

FIG. 1 is a flow diagram showing an illustrative procedure for credit verification.

FIG. 2 is an illustrative embodiment of a credit card for use with the invention.

FIG. 9 is a diagrammatic illustration of a typical structure for converting data registered in the imprinter to BCD electrical signals.

FIG. 10 is a diagrammatic illustration of a strip for indicating the position of a read/write head for use in the invention.

DETAILED DESCRIPTION OF A PREFERRED EMBODIMENT OF THE INVENTION

Figure 11:
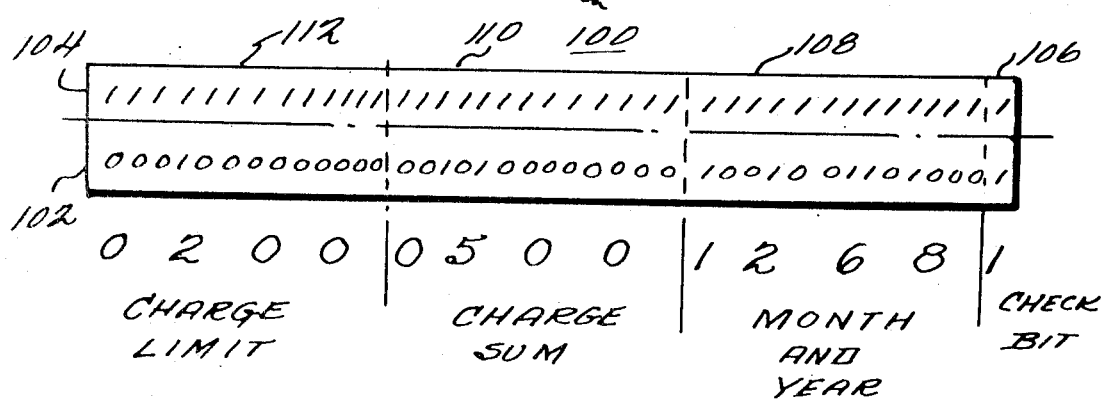
FIG. 11 illustrates a typical magnetic strip for use with the credit card of FIG. 2.

Referring to FIG. 1 there is shown a flow diagram illustrating the steps involved in verifying the credit of a customer, it, of course, being understood that other characteristics of a person or object could be verified in accordance with the steps described in FIG. 1. When an unauthorized card bearer attempts a credit transaction what is actually being checked is whether the credit limit established for the card has been exceeded during the current time interval established by the imprinter. At block 10, it is indicated that all registers are reset, this resetting operation to be described in more detail hereinafter. The customer's card is then placed within the imprinter and a button on the imprinter is depressed to initiate Phase $P_0$ as indicated at 12 in FIG. 1. The operation of the button causes a movable read/write magnetic head to be moved under the control of an electrical motor as will be described in more detail hereinafter. The head will move with respect to data and clock signals which have been magnetically recorded on the card, see magnetic strip 100 on card 101 in FIGS. 2, 3 and 11. During Phase $P_0$, the data on the card will be read from the strip 100 as indicated at 14 in FIG. 1. Referring to FIG. 11, it can be seen that there are two tracks 102 and 104, track 102 containing a check bit at 106, date information at 108, charge sum information at 110 and charge limit information at 112. Basically, the purpose of this information is to insure that the card is not used for credit purchases exceeding the amount indicated by the charge limit data within a predetermined period of time regardless of whether the card bearer is authorized to make credit purchases or not. Hence, this information serves the two-fold purpose of (1) preventing an authorized card bearer from charging more purchases than she is entitled to, and (2) preventing unauthorized card bearers from exceeding the charge limit stated on the card. Of course, since this information is magnetically encoded on the card there is no readily apparent manner by which the card bearer can tamper with it. It should also be noted that each digit is represented in BCD code. All operations within the credit verification procedure of this invention thus take place on BCD numbers although other codes may be employed.

Figure 3:
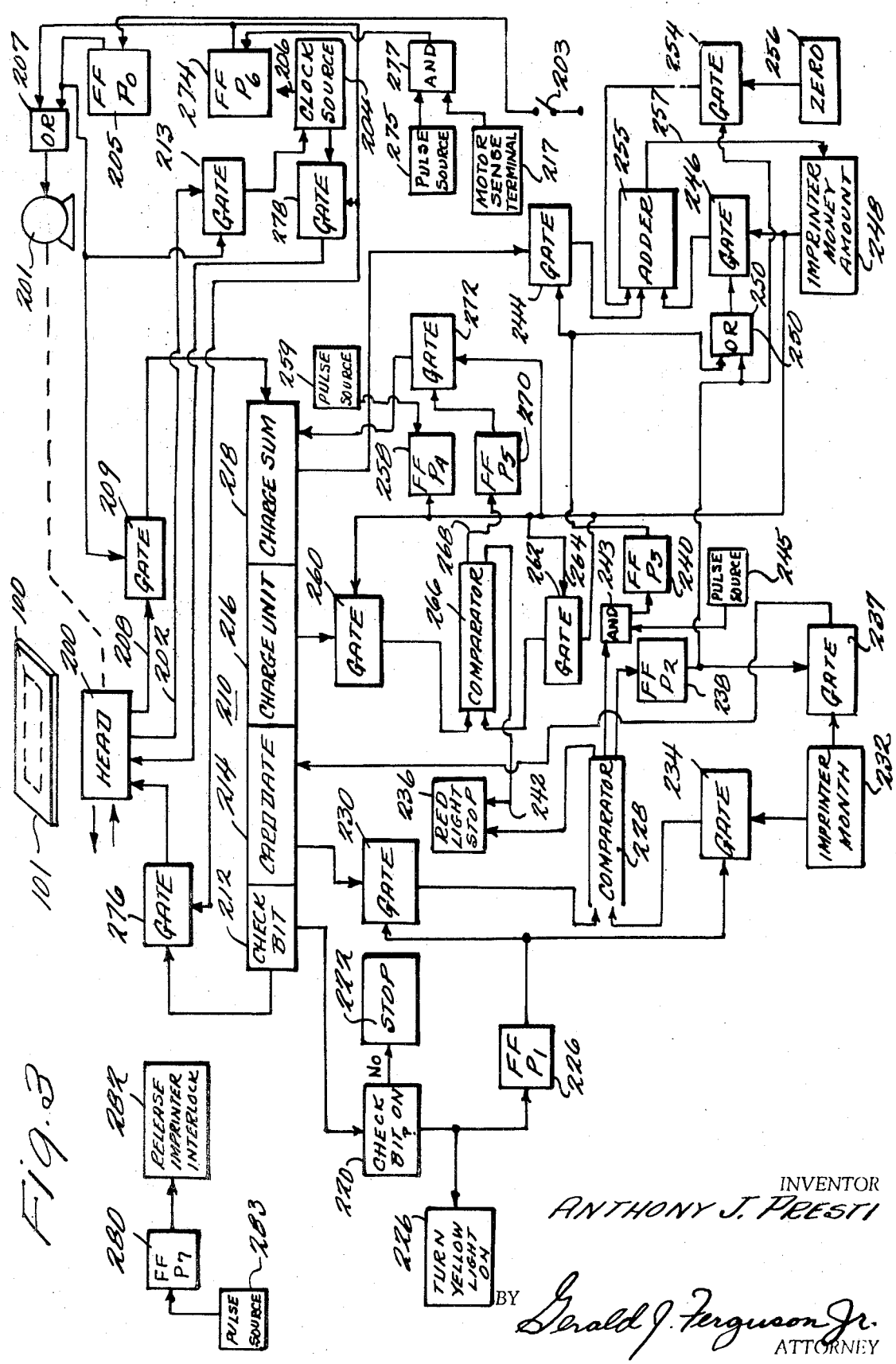
FIG. 3 is a block diagram of illustrative circuitry for forming credit verification.

Referring to FIG. 3 there is shown an illustrative block diagram of circuitry for effecting the credit verification procedure, the read/write head being indicated at 200. The motor 201 must be energized before the head can move. This in turn requires that Phase $P_0$ flip-flop 205 be set. However, flip-flop 205 will be set only when momentary contact switch 203 is closed, this switch being located on the imprinter and operated by a sales clerk or the like.

The head 200 includes two elements which are respectively disposed adjacent the data and clock tracks 102 and 104 shown in FIG. 11. The clock signals are applied over line 202 through gate 213 to synchronize clock source 204 which provides clock signals throughout the circuitry of FIG. 3 over lines generally indicated at 206. The data from track 102 is applied over line 208 and through gate 209 and is read into serial input register 210 under the control of the clock source. As can be seen, the input register is divided into four portions, 212—218 respectively corresponding to the portions 106-–112 shown in FIG. 11.

The last operation within Phase $P_0$ is indicated at 16 in FIG. 1, this operation consisting of a check to determine whether or not the check bit is a 1 or not. This check, although simple, permits a determination as to whether the magnetically encoded data has been tampered with or not. Of course, more check bits could be provided and sophisticated error detection and/or correction codes could be implemented. Referring to FIG. 3, the above check is made at block 220 by appropriate means well known to those of ordinary skill in this art. If the check is not satisfied, the credit procedure is stopped as indicated at block 222 of FIG. 3 and block 18 of FIG. 1. If the check is satisfied, a yellow light is turned on as indicated at block 224 of FIG. 3 and block 20 of FIG. 1. Also the Phase $P_1$ flip-flop of FIG. 3 is set and the credit verification procedure proceeds as indicated at block 22 of FIG. 1.

As indicated at block 24 of FIG. 1 the month stored on the card is compared with the month indicated on the imprinter. The date is set into the imprinter on a daily basis via date wheels as is well known within the credit card imprinting art. Usually the date information provided is that of month, day, and year. Although all three of these date units can be employed, in this embodiment only the month and year are employed. In other words, if the month set into the machine were, for example, 0868, thereby indicating that the current month was August and the year 1968, and if the date on the card were 0868, there would be no need to change the date on the card. This is indicated at block 24 of FIG. 1 where the procedure steps to the block 28 via line 30. The procedure will also step to block 28 whenever the month on the card is earlier than the current month entered into the imprinter via the date wheels. Thus, if the current date were 0868 and the card date were 0768, the check established at block 28 would be satisfied.

As can be seen in FIG. 3, the setting of the Phase $P_1$ flip-flop 226 conditions gate 230 to apply the month information from register portion 214. The construction of register 214 is such that although data is applied serially thereto, the different data portions 212—218 can be read out individually in serial form without effecting the other portions.

As will be described in more detail hereinafter, means are provided for converting the decimal data from the imprinter digit wheels to a BCD electrical signal which is stored in imprinter date register 232. The output from flip-flop 226 also conditions gate 234 and thus the card month and the imprinter month are serially compared in comparator 228, 13 cycles of the comparator being required for effecting the comparator operation. A parallel comparator could also be employed if necessary to increase the speed of operation. This, of course, applies to all serial circuits utilized. If the card month is later than the imprinter month, this indicates that the card or the date wheels on the imprinter have been tampered with or some error has occurred and thus, the credit verification procedure is stopped as indicated at block 236 of FIG. 3 and block 32 of FIG. 1. Also, a red light on the imprinter is turned on.

If the card month is earlier than the imprinter month, this indicates that the card month should be updated to the current month indicated by the imprinter. This is indicated by setting Phase $P_2$ flip-flop 238 of FIG. 3. This in turn conditions gate 237 to serially replace the card month contents of portion 214 of register 210 with the contents of imprinter month register 232. This operation is indicated at blocks 34 and 36 of FIG. 1. After the transfer of the imprinter month to portion 214, the month is updated.

Phase $P_3$ flip-flop 240 is set by pulse source 245 through AND circuit 243 if the card month is the same as the imprinter as determined by comparator 228. If flip-flop 240 has been set gates 244 and 246 are conditioned thereby causing the charge sum from the card to be added to the money amount of the transaction as indicated on imprinter. The imprinter money amount is entered through levers disposed on the imprinter as is well known in this art and as will be described in more detail hereinafter. The money amount or charge sum stored in 218 of register 210 corresponds to the accumulated or total amount of purchases made with the card in the month indicated on the card. Thus, as long as the month stored on the card is the same as the current month indicated on the imprinter, successive credit purchases will be accumulated in the charge sum portion 112 of the card shown in FIG. 2 in a manner to be described in more detail hereinafter. Thus, the setting of Phase $P_3$ flip-flop 240 causes the charge sum to be added to the money amount of the transaction, the sum being temporarily stored in the money amount register 248 over line 257.

If flip-flop 238 has been set thereby indicating that the card month is earlier than the month indicated on the imprinter, it would, of course, be erroneous to add the amount of the current transaction to the accumulated total for the earlier month since one of the basic features of the credit verification procedure is to prevent excessive credit purchases within a predetermined period of time which in the case of the preferred embodiment is one month and, in particular, the current month indicated on the machine. Thus, if flip-flop 238 has been set indicating that the card month was earlier, zero is added to the charge sum, gates 246 and 254 being conditioned to add the zero to the charge sum, which is then placed in register 256. In FIG. 1 the commencement of Phase $P_3$ is indicated at block 38 and the check which occurs at block 228 is indicated at block 40 while the summation of the charge sum to the imprinter money amount is indicated at 42 and the addition of zero to the imprinter money is indicated at block 44. In this embodiment, block 28 and 40 of FIG. 1 are indicated by block 228 in FIG. 3.

After the appropriate addition has occurred, Phase $P_4$ commences with flip-flop 258 being triggered from pulse source 259, which is energized after the addition steps have occurred. This phase is characterized by the comparison of the updated charge sum which is temporarily stored in money amount register 248 as previously stated. Phase $P_4$ flip-flop 258 conditions gates 260 and 262 to effect a serial comparison. As stated before, the accumulated charge sum cannot exceed the charge limit within the time period indicated by the month set into the imprinter and if this occurs an indication is provided on line 264 from comparator 266 which causes the credit verification procedure to stop and the red light to turn on, this being indicated at block 32 of FIG. 1, the comparison being indicated at block 52.

If the charge limit is not exceeded, line 268 will be energized thereby setting Phase $P_5$ flip-flop 270, the commencement of this phase being indicated at block 54 of FIG. 1. With flip-flop 270 set, gate 272 is conditioned to transfer the newly accumulated charge sum to the charge sum portion 218 of register 210, this operation being indicated at block 56 of FIG. 1. Phase $P_6$ flip-flop 274 is then set from pulse source 275 through AND gate 277. AND gate 277 is conditioned only when the motor sense terminal 217 senses that the read/write head 200 has traveled a sufficient distance to insure proper head speed. Gate 276 is now conditioned to serially transfer the data from the input register 210 to the read/write head 200. At the same time clock signals are gated through gate 278 under control of flip-flop 274. Further, the motor 201 is started under the control of flip-flop 274 to permit the updated data to be recorded on the magnetic strip 100 of the card. The above steps are indicated at blocks 58 and 60 in FIG. 1.

Next, as indicated in FIG. 1, the interlock for the imprinting head is released thereby enabling the imprinting operation to proceed. Thus, it is clear that no imprinting operation can occur until the credit verification just described has been satisfied. The interlock is released by energizing a solenoid which will be described in more detail hereinafter. The solenoid is energized when flip-flop 280 is set from the pulse source 283 which, in turn, is actuated after the updated data is recorded on the card.

From the foregoing it can be seen that the credit verification scheme of the instant invention does indeed provide a procedure whereby a card bearer is limited to a certain amount of credit purchases over a predetermined period of time.

Figure 4:
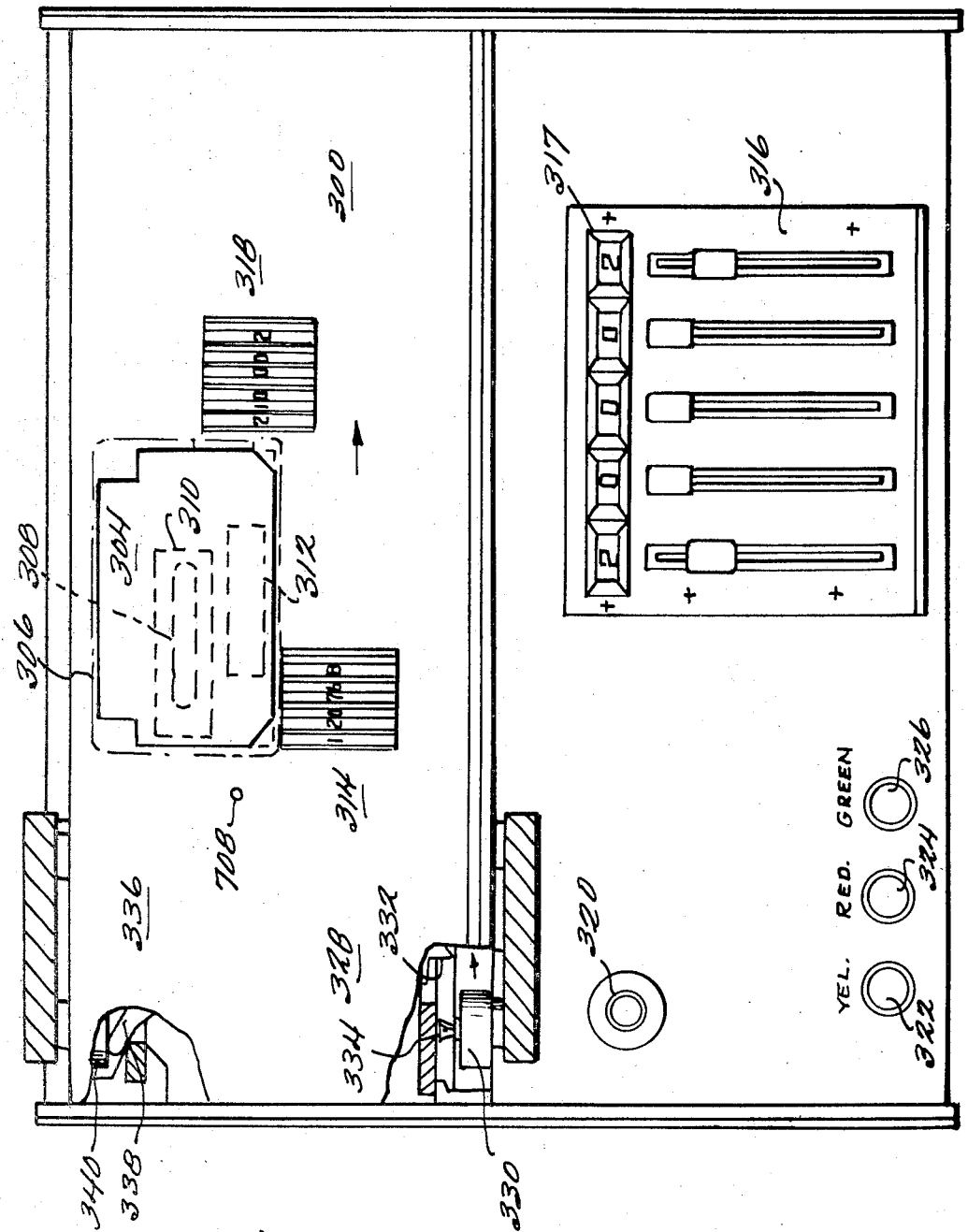
FIGS. 4, 5 and 6 are respectively plan, front, and end views of a variable money amount imprinter in accordance with the invention.

Reference should now be made to FIGS. 4—10 which illustrate a variable amount imprinter incorporating the credit verification system described hereinbefore with respect to FIGS. 1—3 and 11. The variable amount imprinter is a well known device, one type of which is described in U.S. Pat. No. 3,279,369 granted to W. A. Wight on Oct. 18, 1966. Also, a substantial portion of the imprinter head interlock feature has been described in copending U.S. application Ser. No. 702,122 filed by William P. Barbour on Jan. 31, 1968. Referring to FIGS. 1—3, plan, front and end views of a variable amount imprinter in accordance with the invention are respectively shown. In FIG. 4 the imprinting head has been cut away to illustrate more clearly the operation of the invention. The print bed 300 over which the imprinting head 302 travels is shown in FIG. 4. Contained within the head is a roller platen which causes information embossed or etched onto a printing plate, credit card or the like to be imprinted onto a document such as a sales slip or the like disposed in the path of travel of the imprinting head 302, the direction of travel of the imprinting head during the imprinting operation being indicated by the arrow in FIG. 5. This is all well known in the imprinting art. Disposed over the anvil 304 is a credit card 306 indicated in dashed lines. Indicated in dotted lines on the credit card is a dotted portion 310 corresponding to the magnetic tape 100 of the card shown in FIG. 2. Different ways may be employed to provide the magnetic data on the card. In this embodiment, a piece of adhesive magnetic tape is applied to the underside of the card 306. Disposed below the magnetic tape portion 310 is an opening 308 in the anvil 304 and the print bed 300. As will be brought out in more detail hereinafter, the movable magnetic read/write head described hereinbefore moves along the longer axis of the elongated opening 308 to read from and record on the magnetic strip 310.

Also indicated on card 306 is a dotted area 312 which is the same as the area indicated at 103 in FIG. 2 and which contains the raised lettering and numerals corresponding typically to the customer's name, address and identification number. This information is imprinted on the sales slip. However, prior to the recording of such information the previously discussed credit verification must be made, as stated before.

In addition to imprinting the above-mentioned customer information on the card the money amount of the current transaction together with the current month are also printed on the card. Further, in some applications an additional plate is mounted on the print bed for providing information identifying the particular dealer. The month of the transaction is indicated on the date wheels generally indicated at 314, such date wheels being well known within the imprinting art. As shown in FIG. 4 the date wheels are set to Dec. 7, 1968. These wheels are manually adjusted at the beginning of each day by the imprinter operator.

The money amount of the transaction is entered by levers generally indicated 316 which in turn control digit wheels generally indicated 318. As indicated in FIG. 4, the levers are set to $200.02. Further, the digit wheels 318 are also set to $200.02. As is well known in the imprinting art, these levers are controlled by the operator prior to the imprinting operation.

Also shown in FIG. 4 is a pushbutton 320 which corresponds to switch 203 of FIG. 3 and which is depressed by the operator to initiate the above-described credit verification procedure. Also shown in FIG. 4 are lights 322—326, these being respectively yellow, red, and green, the function of these lights having been described hereinbefore with respect to FIGS. 1 and 3.

Figure 5:
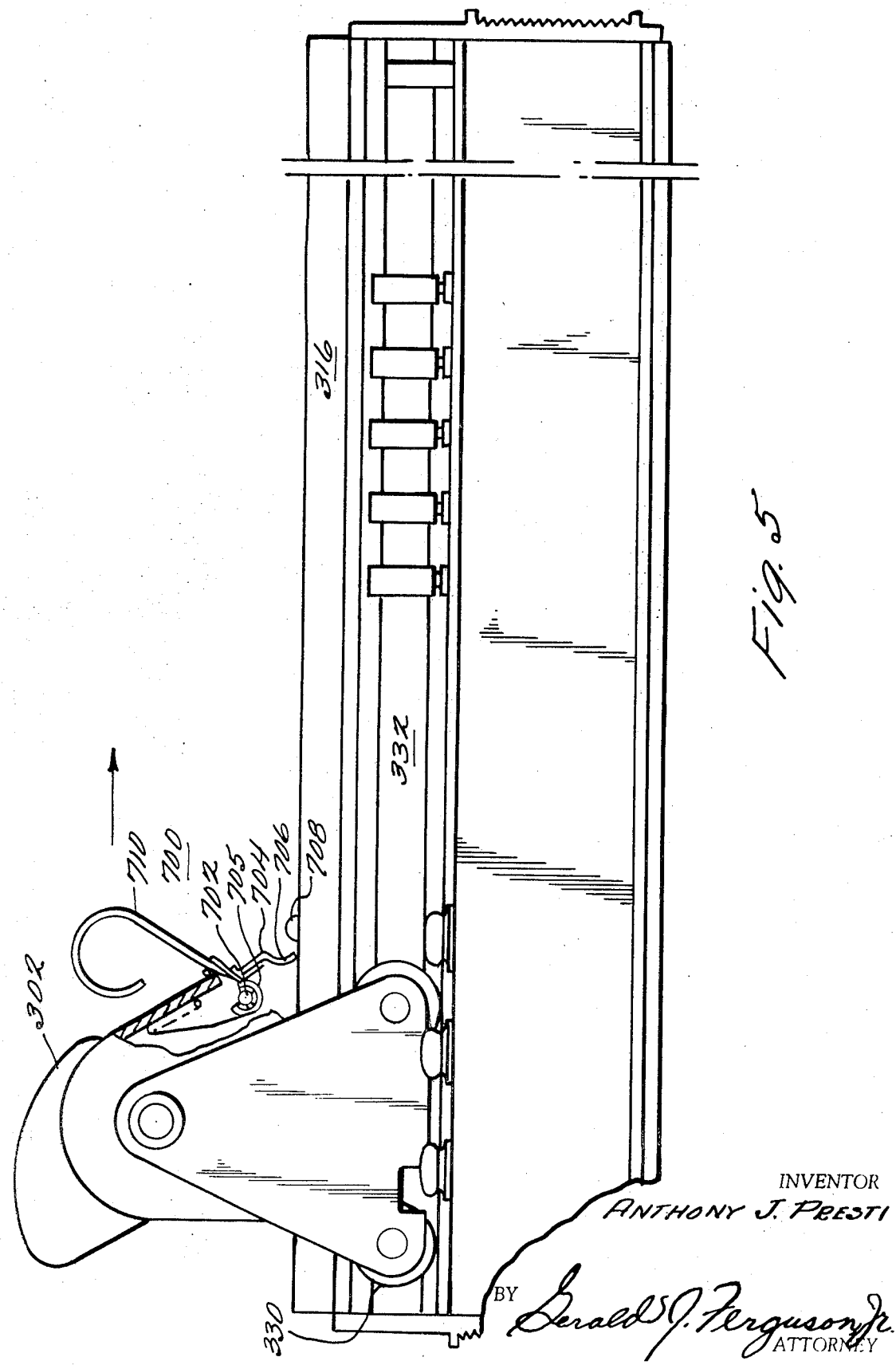

Generally indicated at 328 of FIG. 4 is a broken away section of the print bed showing one of the bearings 330 which supports the imprinting head 302 which travels along the track 332 generally indicated in FIG. 5. Also partially shown at 328 in FIG. 4 is a removable stop member 332 which prevents the pin 334 from forward movement in the direction of the arrow until the stop 332 is moved from the path of travel of the imprinting head. The stop is removed only after the credit verification procedure has been satisfied. As will be described in more detail hereinafter this stop is controlled by a solenoid disposed under the imprinter, this solenoid being energized during Phase $P_7$.

In FIG. 4, generally indicated at 336 is another broken away section of the print bed showing a finger 338 which is engaged by the other rear bearing 340 for the imprinting head, the bearing depressing the finger 338 to the position shown to thereby close a roller position microswitch disposed below the print bed and thereby cause all of the registers employed in the credit verification procedure to be reset and the above-mentioned solenoid to be deenergized. That is, these registers and the solenoid are reset after the imprinting operation has occurred and the imprinting head has been returned to its start position shown in FIGS. 4 and 5.

The overall operation of the imprinter together with credit verifier can now be described with respect to a credit transaction in a department store, for example. When a customer presents a credit card to the sales clerk thereby indicating a desire to make a credit purchase, the clerk first places the card in the position indicated in FIG. 4. Next, a sales slip is placed over the card in a manner well known in the imprinting art. Next, the amount of the transaction is registered into the imprinter by appropriate movement of the levers 316, dial 317 providing the clerk with a visual indication that the lever movement has been correctly performed. The roller head is then moved to an intermediater position which activates card hold down mechanism 710 (which will be described in detail hereinafter) and operates finger 338 through appropriate mechanical linkage not shown thus operating the above-mentioned roller position microswitch. The button 320 is then pushed thereby initiating the credit verification procedure, and, in particular, energizing the motor which causes the read head disposed below the print bed to read the magnetically encoded information on the customer's card. Depending on the outcome of the credit verification check, one of the lights 322—326 will be lit. If the customer's credit limit has not been exceeded and the other checks have been satisfied, the green light 326 will be turned on and the stop 332 will be removed from the path of the pin 334 thereby permitting the imprinting operation. When the clerk sees the green light come on, she pulls the head 302 across the print bed thereby causing the embossed or etched lettering or numerals on the costomer's card to be printed on the sales slip. Also, printed on the sales slip would be the current date, the amount of the current transaction, and dealer information, if any. After the imprinting operation is performed, the clerk returns the head to its start position preparatory to the next imprinting operation. When so returned, the finger 338 is retracted as shown in FIG. 4 to reset all registers for the next data verification procedure. In some instances, it will also be necessary to enable the button 320 when depressed to reset all data verification registers since at the beginning of the day, some assurance must be had that all data verification registers are reset for the first credit transaction of the day after the power for the imprinter has been turned on.

Figure 6:
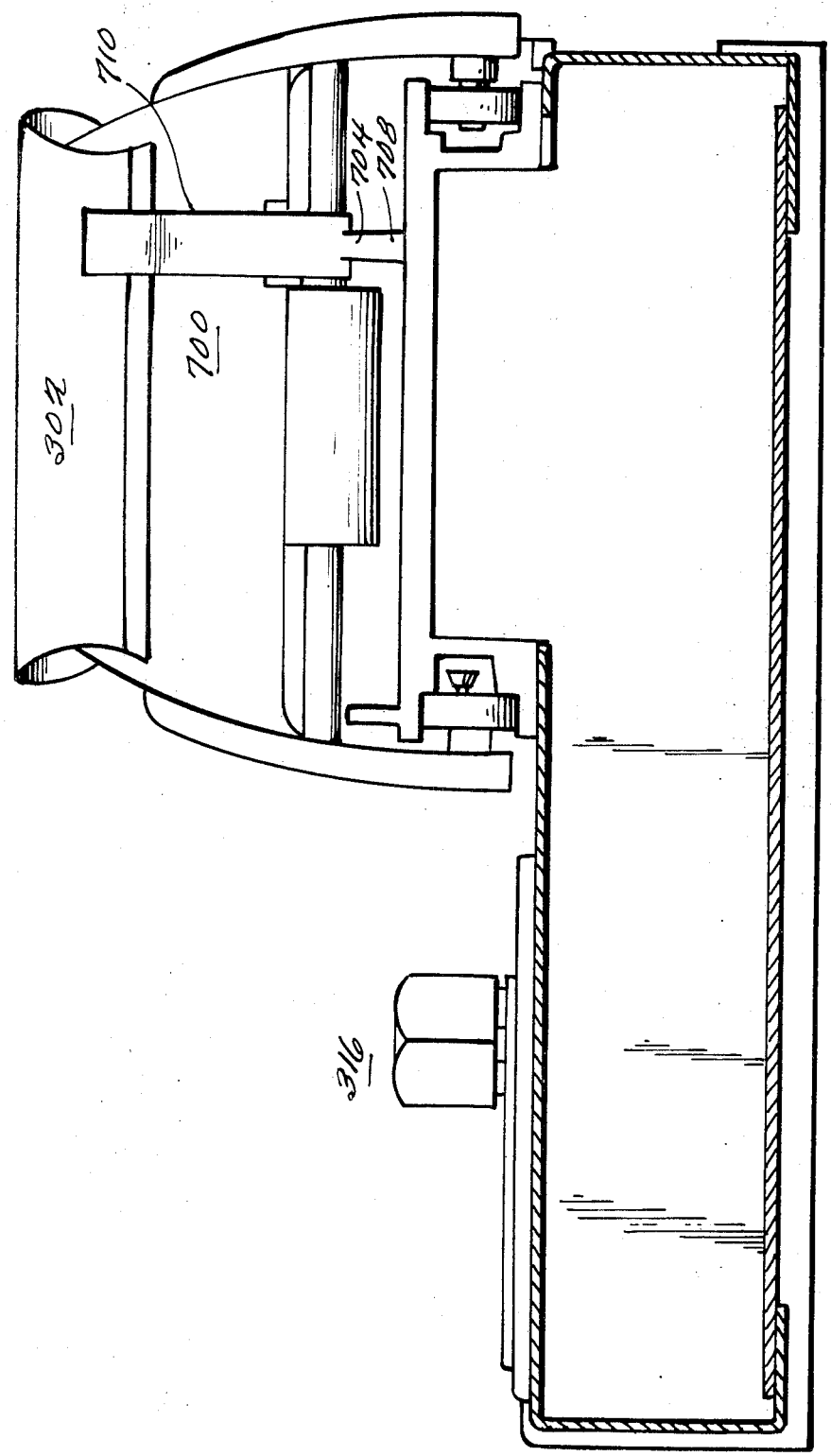
Figure 7:
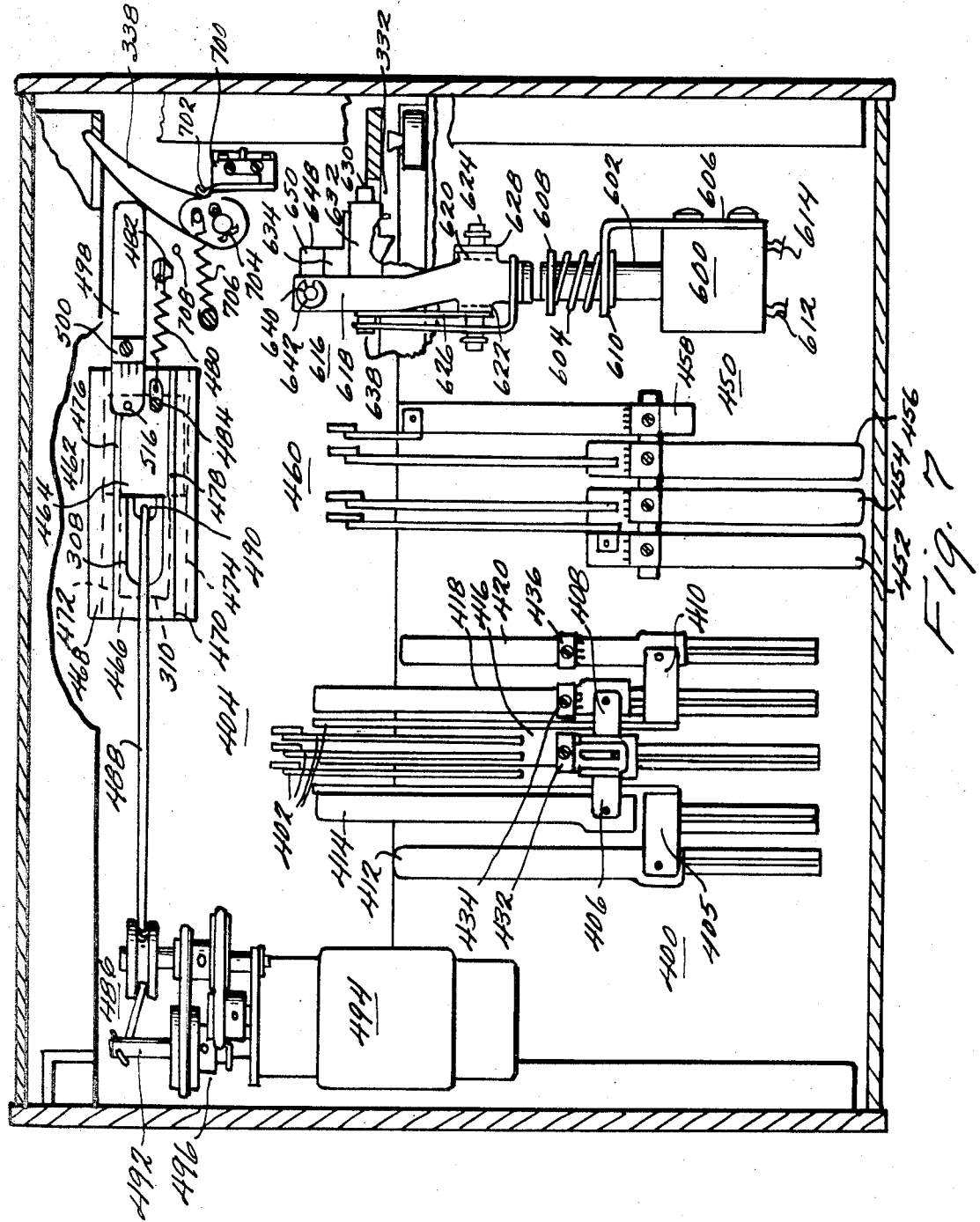
FIG. 7 is an underside view of the imprinter of FIGS. 5—7.

Referring now to FIG. 7 there is shown the underside of the imprinter shown in FIGS. 4—6. Generally indicated at 400 are the levers corresponding to the money amount levers shown at 316 in FIG. 4.

As can be seen from inspection, these are also set to correspond to a money amount transaction of $200.02. The levers control the position of the digit wheels by a rack and gear arrangement which is well known in the imprinting art and illustrated in the previously mentioned patent granted to W. A. Wight. The racks are generally shown at 402, while the digit wheels are generally indicated at 404. The rack arms 402 are connected by extensions 405—410 to the levers 400 which project to the upper side of the imprinter, these extensions being well known. Also connected to the levers 400 are a plurality of strips 412—420. On the upper side of these strips are disposed the digits which are presented at dial 317 on the upper side of the imprinter to thereby enable the operator to visually verify that she has entered the correct amount corresponding to the amount of the current credit transaction. Such strips are well known. Disposed on the underside of these strips in accordance with the invention are metallic conductors for converting the entered money amount into a BCD coded electrical signal which is utilized by the credit verification circuitry and which is entered into register 248 of FIG. 3. Referring to FIG. 9 strip 418 is shown in detail, this strip being typical of the encoding strips 412—420. Also shown is a plurality of electrically conducting fingers 422—430, these fingers being mounted on a bracket 434. Referring to FIG. 7 brackets 432—436 are shown, each of these brackets having electrically conducting fingers mounted thereon as indicated. Note that such brackets are not provided for strips 412 and 414 since these strips do not correspond to the dollar portion of the credit transaction and since only the dollar portion enters into the credit verification procedure in this embodiment.

Returning again to FIG. 9, disposed on the underside of the strip 418 are 10 portions generally indicated at 0—9, the strip 418 of FIG. 7 is disposed at the 0 position and thus none of the fingers 422—430 engage any of the metallic portions generally indicated at 431 shown on the underside of strip 418. The metallic portion 438 corresponds to a ground terminal. As indicated in FIG. 7 at strip 420, these strips are connected to levers 400 and thus when the levers are moved the strips also move. Hence, if the strip 418 were moved relative to the fingers 422—430 so that the portion 2 were disposed beneath the fingers, the fingers 424 and 430 would engage the electrical portions to cause electrical signals corresponding to the BCD code for 2 to be sent to the appropriate place in register 248 of FIG. 3. From the foregoing it is clear how the three digits corresponding to the dollar portion of the money amount transaction are BCD encoded. Electrical wires 440-—448 are utilized to connect the BCD encoded signal back to the register 248, these wires not being shown in FIG. 7 for purposes of clarity.

The current date of the transaction is also BCD encoded, the strip and finger brackets for effecting this being generally indicated at 450. The method of BCD coding is exactly the same as that described herein before with respect to the money amount. The encoding strips 452—458 are mechanically connected to the digit wheels generally indicated at 460 by a rack and gear arrangement or the like. The racks are moved in accordance with the movement of the digit wheels. The details of the mechanical connection are not given inasmuch as they are not a part of the invention. Further, various mechanical means would be well known for effecting the desired movement of the strips 452—458 with respect to their respective finger brackets in response to the movement of the date wheels. It should be noted that only the date wheels corresponding to the month and year are encoded since this is the only time interval information employed in the illustrative verification procedure of FIG. 1.

The magnetic read/write head portion of this information is generally shown at 462, the head being shown at 464. The head moves within a guide generally indicated at 466 having two downwardly extending guide members 468 and 470. The inner sides 472 and 474 of the guide members 468 and 478 are respectively inwardly tapered. The outer sides 476 and 478 of the head 464 are outwardly tapered and respectively corresponding to the inwardly tapered sides 472 and 474. Thus, the read head is securely held up between the guide members 468 and 470. The opening 308 of FIG. 4 is disposed above the read head thereby permitting the desired reading from and writing on the magnetic strip of the customer's credit card, the strip being indicated at dotted line 310. Typically, some sort of suitable material would cover the opening 308 to prevent the passage of dust and the like through the opening while at the same time facilitating the transducing action of the magnetic head.

The head is normally biased by spring 480 to the position shown in FIG. 7, the spring being secured to the underside of the print bed of suitable means indicated at 482 and at its opposite end to the head 464 at 484. A wheel and pulley arrangement generally indicated at 486 is employed to move the head 464 along to the read/write path, this arrangement being connected to the head via cord 488 at 490. The cord 488 is wound up upon the post or shaft 492 upon energization of a motor 494, which corresponds to motor 201 of FIG. 3, suitable speed reduction means being generally indicated at 496. Motor 494 is reversible and after the head 464 traverses the magnetic tape, it is reversed thus returning the head to the starting position indicated in FIG. 7. Under the action of the spring 480, tension is maintained in drive cord 488 during reverse head travel.

In order to sense that the head 476 has completely traversed the magnetic strip, and is thus ready to be returned to its starting position, a head position indicating strip 498 is provided together with a finger bracket 500. Referring to FIG. 10, the strip 498 is shown in detail and the fingers of the bracket 500 are indicated at 502, 504 and 506. The structure of the bracket 500 and the fingers 502—506 are the same, in principle, as the bracket and fingers of FIG. 9. Electrically conducting portions 508, 510, 512, and 514 are also shown mounted on the strip 498. As indicated in FIG. 7 strip 498 is secured by appropriate means to head 464 at point 516 while bracket 500 is fixedly mounted with respect to the underside of the print bed. The portion 510 corresponds to the motor sense terminal 217 of FIG. 3. As stated above, the direction of travel of the head is reversed after it either reads or writes data. It must be returned to the position established by portion 510. The reason for this will be clarified shortly hereinafter. The finger 502 provides a ground signal.

As the strip 498 moves in the direction of the arrow, finger 506 will engage terminal portion 512 which is utilized during the record phase to commence recording of the information. Thus, the information will be recorded at full speed of the head. This follows since the head must be fully returned to the motor sense terminal 217 (portion 510) before the motor can start and since portion 510 is sufficiently removed from portion 512. This terminal is connected to output terminal 516 via electrical conductor 518 while terminal 510 is connected to output terminal 511 via conductor 513. When finger 506 engages portion 514 this indicates that the head has completely traversed the magnetic tape and the motor 494 is ready to be reversed and thus return the head to its starting position at portion 510. When the finger 504 again reaches terminal 510 a pulse is generated which turns the motor 494 off. It will be realized by those of ordinary skill in the art, that one possible modification of this invention is to record in one direction and to read in the opposite direction. Wires 518—524 are utilized to respectively connect portions 508—514 to appropriate circuits within the data verification circuitry of FIG. 2.

As stated hereinbefore, if the credit verification procedure is satisfied, the green light 326 of FIG. 4 will be turned on and the stop 332 of FIG. 7 will be retracted so as to permit the imprinting operation to take place. Stop 332 is also shown in FIG. 7, this stop being retracted whenever solenoid 600 is energized. Solenoid 600 incorporates a plunger 602 which is normally extended as shown in FIG. 7, it being biased outwardly by spring 604 which is disposed between a bracket 606 connected to the solenoid casing and a retaining ring 608 mounted on the plunger 602. The bracket 606 has an aperture indicated at 610 for permitting passage of the plunger therethrough. Upon energization of the solenoid via wires 612 and 614, the plunger is retracted thereby permitting interlock release mechanism operation to be effected, the elements comprising this mechanism being generally indicated at 616 and some of them being described in detail in the before-mentioned U.S. application Ser. No. 702,122.

Figure 8:
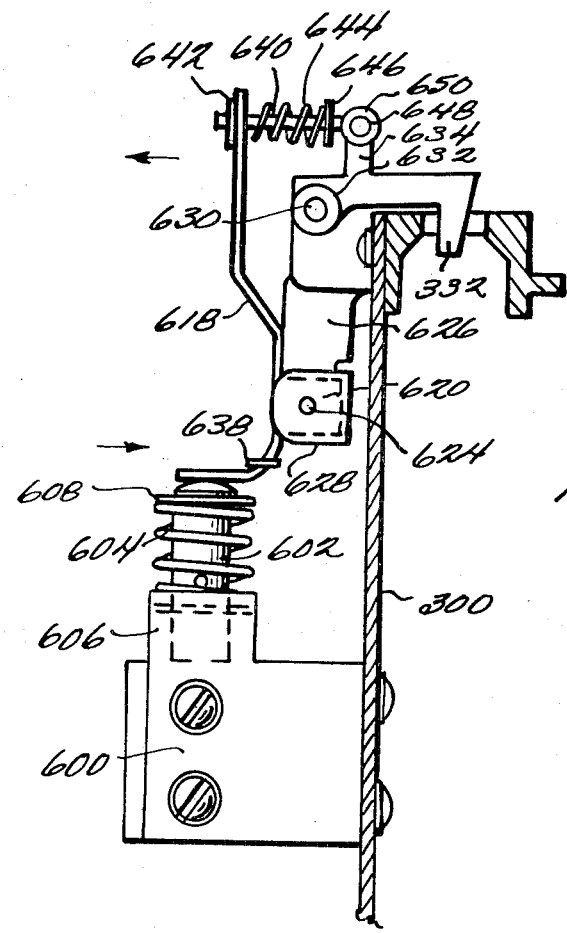
FIG. 8 is a detail taken along the line 8–8 of FIG. 7.

Briefly, the interlock release mechanism 616 may be described as follows. Referring to FIGS. 7 and 8 a lever arm or bale 618 includes a U-shaped portion indicated at 620 and 622 of FIGS. 7 and 8. This u-shaped portion is apertured in both legs thereof and mounted on shaft 624 thereby permitting rotation of bale 618 about shaft 624. Shaft 624 is in turn mounted on a bracket 626 having a U-shaped portion 628, the U-shaped portion 620 of bale 618 fitting into the U-shaped portion 628 of of bracket 626. Bracket 626 is secured by appropriate means (not shown) to the underside of the imprinter. Thus, shaft 624 is fixed in space. The stop member 332 is shown in FIGS. 7 and 8 in the position where it prevents forward movement of the imprinting head until retracted. The stop rotates on shaft 630 which is also fixedly mounted with respect to the underside of the imprinter by means not shown. The stop 332 includes an elongated portion 632 which is rotatably disposed about shaft 630. An actuating arm 634 is also connected to the stop 332. A wire spring 638 is wrapped around shaft 624 and connected to shaft 630 and the underside of bale 618 so as to bias the end of the bale adjacent the plunger upwardly—that is, in the direction of the arrow in FIG. 8.

The other end of the bale is apertured and connected through this aperture is a pin 640, a retaining ring 642 keeping the pin connected to the bale although the pin is free to move through the aperture. As can best be seen in FIG. 8 a spring 644 is disposed around pin 640 engaging at one end thereof bale 618 and at the other end thereof a retaining ring 646 fixedly secured to pin 640. Pin 640 also has an upper portion 648 which extends perpendicularly with respect to the portion extending through the spring 644. Portion 648 extends through sleeve 650 which is in turn connected to actuating arm 634 of stop 332.

Having described the structural elements of the interlock mechanism 616, the operation thereof briefly is that when the solenoid 600 is energized, its plunger is retracted thereby permitting the bale 618 to rotate about shaft 624 and thus pull actuating arm 634 of stop 332 in the direction of the arrow. Hence, the stop is removed from the path of travel of the imprinting head because of the action of spring 634 until the bale 618 is returned to the position shown in FIG. 8 under the action of plunger 602. Normally, the solenoid 600 is deenergized whenever the power is turned off or when the imprinting head is returned to its start position after an imprinting operation.

As stated before when the imprint head is returned to its start position, finger 338 (see FIG. 7) is returned to the position shown. This causes the contact 700 of microswitch 702 to be depressed thereby closing the switch and generating an appropriate pulse for resetting all credit verification circuit registers and for deenergizing solenoid 600. As soon as the imprinting head leaves its start position, the finger 338 is rotated about shaft 704 under the action of spring 706 to an appropriate stop position 708. Thus, when so removed from the start position the switch remains open in preparation for the generation of the next pulse.

Optional means are also provided for holding the credit card securely in place during the read and write phases described hereinbefore. Referring to FIG. 5 there is shown a lever means generally indicated at 700. A shaft 702 is fixedly positioned with respect to the side walls of the head 302. The lever is rotatably mounted about shaft 702 by appropriate means. The lower arm 704 includes a curved portion 706 which engages a post 708 (also see FIG. 4) mounted on the print bed whenever the head 302 is moved forward until it engages the stop member 332, this portion corresponding to the before-mentioned intermediate position to which the imprinter head is moved to thereby effect energization of motor 494. Note in FIG. 4 the distance the head 302 is permitted to move forward before engaging stop member 332. As the curved portion 706 engages post 708, the upper arm 710 of lever 700 rotates downwardly onto the credit card which has previously been placed on the anvil. This rotation occurs against spring means 705 which tends to maintain the lever 700 in the position shown in FIG. 5.

Thus, a substantially constant clearance is established between the card and read/write head as the head moves along adjacent the card in spite of the fact that the card might be slightly wrinkled as is usually the case after substantial use. AFter the credit verification has been satisfactorily completed, the imprinter head is permitted to move forward to effect the imprinting operation since the curved portion 706 slips off the post 708 as the clerk moves the head forward, it being assumed, of course, that the clerk has first placed in the sales slip in the print bed if she had not done so previously. Further, the lever will return to the position shown in FIG. 5.

Numerous modifications of the invention will become apparent to those of ordinary skill in the art upon reading the foregoing disclosure. During such a reading it will be evident that this invention provides unique apparatus combining a variable amount imprinter with credit verification circuitry for accomplishing the objects and advantages herein stated. Still other objects and advantages and even further modifications will become apparent from this disclosure.

I claim:

1. Apparatus comprising:
   imprinter means for imprinting information from a printing plate onto a document, said imprinting means including means for registering first data manually by an operator, said first data relating to a current credit transaction proposed for said plate;
   said printing plate including second data recorded thereon relating to (1) the usage of said plate prior to said current transaction and (2) the maximum permissible usage of said plate for credit transactions, said data recorded on said plate not being visible to the unaided human eye;
   means for converting said first data to first electrical signals;
   read/write means movably mounted with respect to said imprinting means;
   means for fixedly positioning said plate on the print bed of said imprinting means;
   means for moving said read/write means with respect to the data recorded on said plate to read the data recorded on said plate and thereby generate second electrical signals corresponding to said second data;
   credit verification circuitry responsive to said first and second electrical signals for determining whether said plate has been used for credit transactions exceeding the maximum permissible usage established for said plate; and
   means for indicating to said operator whether said maximum permissible usage has been exceeded.

2. Apparatus as in claim 1 where said second data is magnetically recorded with respect to said printing plate and said read/write means is a magnetic read/write head.

3. Apparatus as in claim 2 where said print bed includes an aperture therein, the magnetically encoded portion of said printing plate being disposed over said aperture when said plate is positioned in said print bed, and the path of travel of the movable read/write head being disposed beneath said aperture.

4. Apparatus as in claim 3 where said data verification circuitry updates the said second data recorded on said plate if the proposed current credit transaction is approved and generates a third electrical signal corresponding to the updated data; and where said read/write head is responsive to said third electrical signal to write said updated data on said printing plate.

5. Apparatus as in claim 4 including means for insuring that the movable magnetic read/write head is moving at full speed before said third electrical signal is written on said magnetically encoded portion of said printing plate.

6. Apparatus as in claim 4 where said means for insuring that the read/wirte head is moving at full speed includes:
   first sensing means for sensing the position of said read/write head when it is at the beginning of the path it traverses with respect to the magnetically encoded portion of the printing plate;
   record sensing means for sensing the position of said read/write head when it is a predetermined distance from said beginning of the path, said predetermined distance corresponding to that distance from the beginning of the path where said head will reach its full speed; and means responsive to said first sensing means for preventing said read/write head from writing said third electrical signal unless said read/write head starts from the beginning of said path to thereby insure that the head is traveling at full speed when it passes said second sensing means.

7. Apparatus as in claim 6 where said means for moving the read/write head includes:
   a reversible motor;
   biasing means tending to position said read/write head at the beginning of its path of travel;
   third sensing means for sensing that said read/write head has reached the end of said path;
   means responsive to said third sensing means for reversing said reversible motor; and
   said read/write head being returned to the beginning of said path under the control of said biasing means.

8. Apparatus as in claim 7 where said means for moving said read/write head includes wheel and pulley means connected between said reversible motor and said head via a cord for moving said head forwardly along said path.

9. Apparatus as in claim 1 including a stop member means for preventing the imprinting operation until said credit verification circuitry has performed its check, said stop member being responsive to said circuitry.

10. Apparatus as in claim 9 where said stop member projects into the path traveled by the imprinting head of said imprinting means; and where said apparatus includes means for retracting said stop member from the last-mentioned path, when said credit verification circuitry indicates that said printing plate is approved for usage with the current proposed credit transaction.

11. Apparatus as in claim 10 where said means for retracting said stop member from said paths includes
   a solenoid responsive to said credit verification circuitry, the plunger of said solenoid being moved when said credit verification circuitry indicates approval; and
   means responsive to the movement of the solenoid plunger to remove said stop member from said paths.

12. Apparatus as in claim 9 including means for indicating that the imprinting head of said imprinting means has returned to its start position after completing an imprinting operation; and means responsive to said last-mentioned indicating means for resetting all registers of said credit verification means and for deenergizing said solenoid to thereby prevent another credit transaction until the credit verification for said another transaction is determined by said verification circuitry.

13. Apparatus as in claim 1 where at least some of said first data registered in said registering means by said operator are represented by decimal digits; and where said apparatus includes a plurality of means for respectively converting said decimal digits to BCD encoded electrical signals.

14. Apparatus as in claim 13 where each said means for BCD encoding one of said decimal digits includes a movable strip;
   means for moving said strip with respect to said apparatus in response to said operator registering said digits in said registering means;
   said strip being divided into ten successive portions disposed along the strip, each portion containing electrically conductive terminals so positioned with respect to one edge of the strip so as to correspond to one of the BCD codes for the decimal digits and all ten of the codes being respectively represented by all ten of the portions along the strip; and
   means fixedly disposed with respect to said apparatus having at least four fingers for sensing said successive portions along said strip, certain ones of the fingers being energized depending upon which portion of the strip the fingers are positioned over, the energized conductors corresponding to said BCD code of the registered digit corresponding to said strip.

15. Apparatus as in claim 1 where said first data registered on the imprinting means by said operator includes the money amount corresponding to said current proposed credit transaction which is to be approved or disapproved by said credit verification circuitry; and a predetermined time interval for which said credit transaction is to be approved in relation thereto.

16. Apparatus as in claim 15 where the second data recorded on said plate includes (1) the maximum charge sum permitted for the plate within said predetermined time interval; (2) the time period in which the plate was last used; and (3) the accumulated money amount of past credit transactions.

17. Apparatus as in claim 16 where said credit verification circuitry is responsive to the last time interval in which the plate was used and the current time interval for which the credit transaction is to be approved or disapproved to establish whether the time interval for which the plate was last used is later than the current time interval to thereby determine if the plate or imprinter register means have been tampered with or the information has been erroneously transmitted from either the card or the imprinting means.

18. Apparatus as in claim 1 where said second data includes error detection information and where said data verification circuitry includes circuits for determining whether said second data has been tampered with or whether data transmission errors have occurred.

19. Apparatus as in claim 18 where said error detection information includes a single bit of data which should always be 1.

20. Apparatus as in claim 1 where said printing plate is a credit card.

21. Apparatus as in claim 20 where said credit card includes a strip of magnetic tape attached to the back of said card and where said second data is magnetically recorded on said strip of tape.

22. Apparatus as in claim 20 where said second data is recorded along one track disposed along said strip and where said second data includes clock signals for said credit verification circuitry recorded along a second track disposed substantially parallel to said first track.

23. Apparatus as in claim 1 including means for securing said plate on said imprinting means so that a substantially constant clearance is maintained between the plate and the read/write means as the latter means moves with respect to the plate in spite of the fact that the plate will tend to become wrinkled with use.

24. Apparatus as in claim 23 where said plate securing means includes:
   lever means rotatably mounted with respect to the forward portion of the imprinter head of the imprinting means;
   spring means for normally maintaining said lever means clear of said plate; and
   a post so positioned on the print bed of said imprinting means that when the imprinter head is positioned adjacent where the plate is placed on the bed, the lower arm of the lever means will engage the post so that the upper arm of the lever means will be rotated to a position where the upper arm holds the plate in place.